(12) United States Patent
Uchida et al.

(10) Patent No.: US 7,201,993 B2
(45) Date of Patent: Apr. 10, 2007

(54) POLYMER ELECTROLYTE FUEL CELL

(75) Inventors: Makoto Uchida, Hirakata (JP); Yasushi Sugawara, Higashiosaka (JP); Eiichi Yasumoto, Kyoto (JP); Akihiko Yoshida, Hirakata (JP); Junji Morita, Moriguchi (JP); Masao Yamamoto, Kishiwada (JP); Shinya Kosako, Nishinomiya (JP); Osamu Sakai, Neyagawa (JP); Yoshihiro Hori, Ikoma (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 377 days.

(21) Appl. No.: 10/089,814

(22) PCT Filed: Aug. 3, 2001

(86) PCT No.: PCT/JP01/06716

§ 371 (c)(1),
(2), (4) Date: Apr. 4, 2002

(87) PCT Pub. No.: WO02/13297

PCT Pub. Date: Feb. 14, 2002

(65) Prior Publication Data

US 2002/0182478 A1 Dec. 5, 2002

(30) Foreign Application Priority Data

| Aug. 4, 2000 | (JP) | ............................. 2000-236767 |
| Aug. 18, 2000 | (JP) | ............................. 2000-248366 |
| Aug. 18, 2000 | (JP) | ............................. 2000-248931 |
| Aug. 21, 2000 | (JP) | ............................. 2000-249353 |

(51) Int. Cl.
*H01M 4/00* (2006.01)

(52) U.S. Cl. ............................. 429/44; 429/40; 429/42

(58) Field of Classification Search ............ 429/40–44; 502/101
See application file for complete search history.

(56) References Cited

U.S. PATENT DOCUMENTS 5,211,984 A 5/1993 Wilson (Continued)

FOREIGN PATENT DOCUMENTS

DE EP 0917226 * 5/1999

(Continued)

OTHER PUBLICATIONS

IPDL JPO Machine Translation for JP 10-189004 (publication date of Jul. 1998).*

(Continued)

*Primary Examiner*—Patrick Joseph Ryan
*Assistant Examiner*—Julian Mercado
(74) *Attorney, Agent, or Firm*—Akin Gump Strauss Hauer & Feld, LLP

(57) ABSTRACT

The present invention provides a polymer electrolyte fuel cell having an increased reaction area by forming a gas channel, a proton channel and an electron channel very close to each other inside a catalyst layer. This polymer electrolyte fuel cell includes a hydrogen ion conductive polymer electrolyte membrane; and a pair of electrodes having catalyst layers sandwiching the hydrogen ion conductive polymer electrolyte membrane between them and gas diffusion layers in contact with the catalyst layers, in which the catalyst layer of at least one of the electrodes comprises carbon particles supporting a noble metal catalyst, and the carbon particles include at least two kinds of carbon particles adsorbing a hydrogen ion conductive polymer electrolyte in mutually different dispersed states.

4 Claims, 11 Drawing Sheets

U.S. PATENT DOCUMENTS

| | | | |
|---|---|---|---|
| 5,723,173 A | | 3/1998 | Fukuoka et al. |
| 5,728,485 A | * | 3/1998 | Watanabe et al. .............. 429/41 |
| 5,766,788 A | * | 6/1998 | Inoue et al. ................... 429/42 |
| 6,015,635 A | * | 1/2000 | Kawahara .................... 429/42 |
| 6,060,187 A | | 5/2000 | Uchida et al. |

FOREIGN PATENT DOCUMENTS

| | | | |
|---|---|---|---|
| EP | 0 945 910 A2 | | 9/1999 |
| JP | 61-295387 A | | 12/1986 |
| JP | 61-295388 A | | 12/1986 |
| JP | 63-097232 A | | 4/1988 |
| JP | 64-062489 A | | 3/1989 |
| JP | 01286257 | * | 11/1989 |
| JP | 2-162650 A | | 6/1990 |
| JP | 03-022361 A | | 1/1991 |
| JP | 03-184266 A | | 8/1991 |
| JP | 03-295172 A | | 12/1991 |
| JP | 05-036418 A | | 2/1993 |
| JP | 5-151981 | * | 6/1993 |
| JP | 06-246160 A | | 9/1994 |
| JP | 07-246336 A | | 9/1995 |
| JP | 08-066632 A | | 3/1996 |
| JP | 08-162123 A | | 6/1996 |
| JP | 08-264190 A | | 10/1996 |
| JP | 10-189004 A | | 7/1998 |
| JP | 10-270056 A | | 10/1998 |
| JP | 2000-000467 A | | 1/2000 |
| JP | 2000-100447 A | | 4/2000 |
| JP | 2001-250564 A | | 9/2001 |
| WO | 94/24710 A1 | | 10/1994 |

OTHER PUBLICATIONS

Mashiro Watanabe, "New Preparation Method Of A High Performance Gas Diffusion Electrode Working At 100% Utilization Of Catalyst Clusters And Analysis Of The Reaction Layer", *J. Electroanal. Chem.*, vol. 197 pp. 195-208 (1986).

* cited by examiner

FIG. 4
(a)
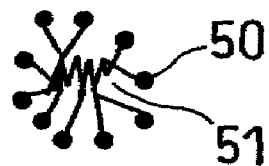
(b)
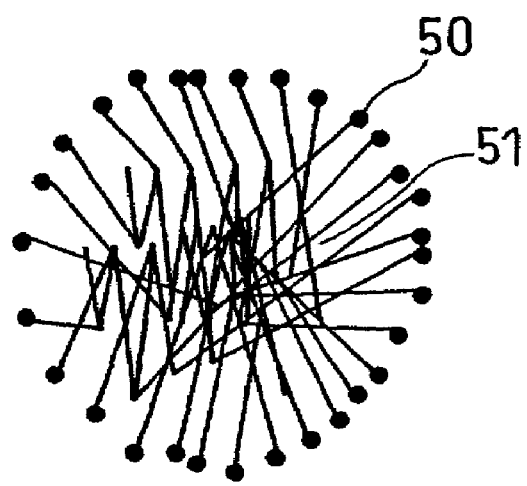
FIG. 5
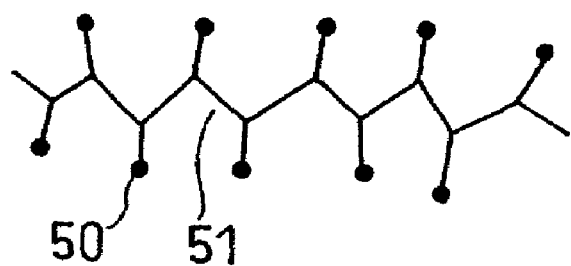

FIG. 6
(a)
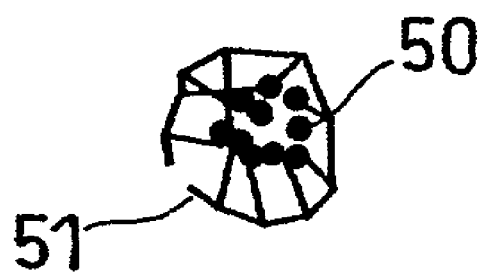
(b)
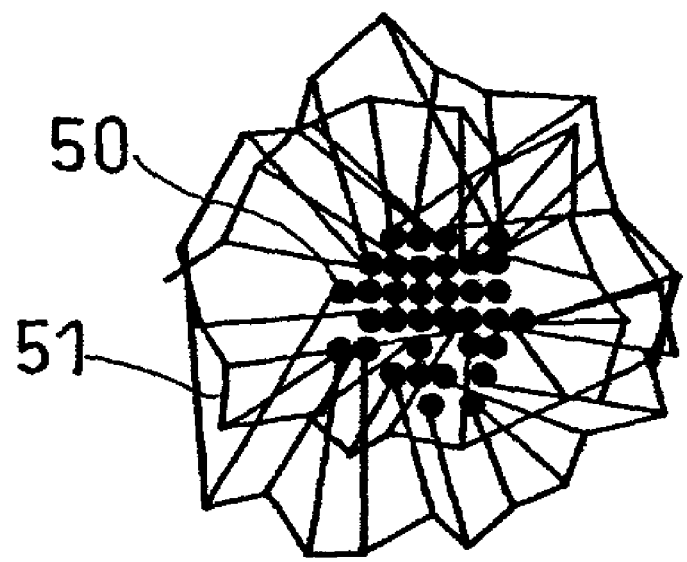

FIG. 7
(a)
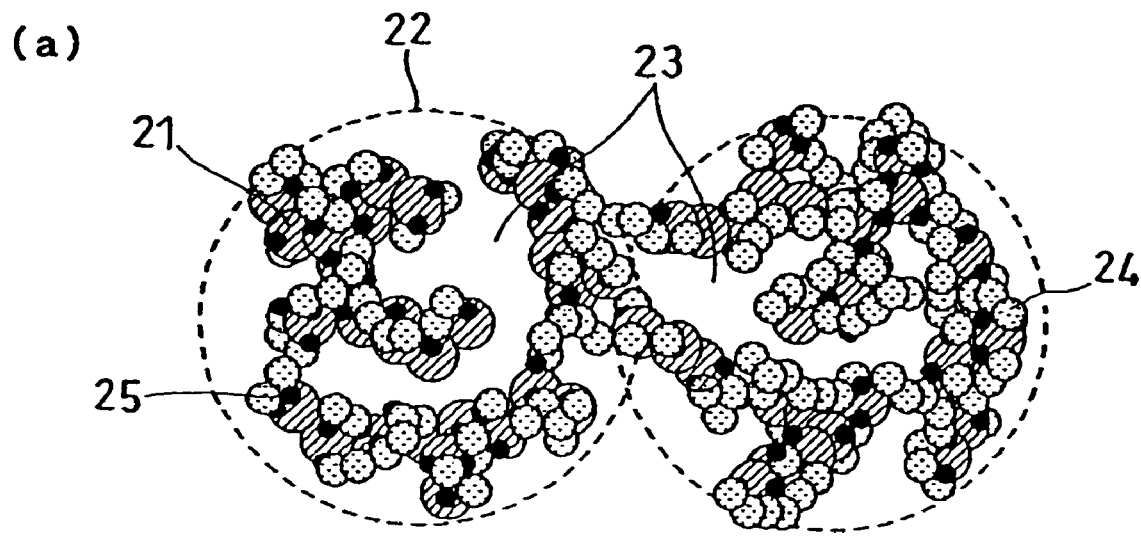
(b)
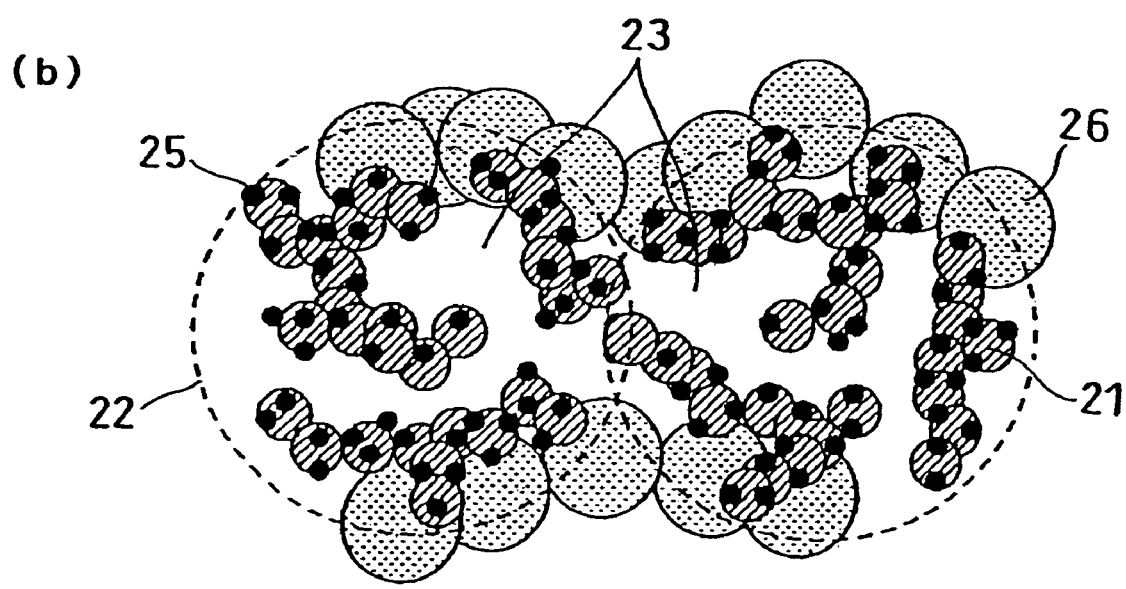
PRIOR ART

POLYMER ELECTROLYTE FUEL CELL

TECHNICAL FIELD

The present invention relates to fuel cells which use pure hydrogen, reformed hydrogen obtained from methanol or fossil fuels, or a liquid fuel, such as methanol, ethanol and dimethyl ether, as a fuel and uses air or oxygen as an oxidant, and more particularly relates to fuel cells which use a solid polymer as an electrolyte. More specifically, the present invention relates to a method for manufacturing a catalyst layer constituting an electrode.

BACKGROUND ART

One of the most important factors which govern the discharge performance of solid polymer electrolyte fuel cells is the size of the reaction area at the interface of three phases formed by pores which are passages for supplying a reaction gas, a solid polymer electrolyte having proton conductivity in a moistened state, and an electrode material having electronic conductivity at the interface between a solid polymer electrolyte membrane having hydrogen ion conductivity and an electrode.

Hitherto, a layer produced by dispersing an electrode material and a polymer electrolyte in a mixed state was provided at the interface between an electrolyte membrane and a porous electrode in an attempt to increase the three-phase interface. For example, JP-B-S62-61118 and JP-B-S62-61119 use a method which comprises applying a mixture of a dispersion of polymer electrolyte and a catalyst compound on a polymer electrolyte membrane, hot-pressing the coated membrane and electrode material to join them, and then reducing the catalyst compound. They also use another method which comprises applying a mixture of a dispersion of polymer electrolyte and a catalyst compound on a polymer electrolyte membrane after reducing the catalyst compound, and hot-pressing the coated membrane and electrode material to join them.

JP-B-H02-48632 discloses a method comprising molding a porous electrode, spraying a dispersion of an ion-exchange resin on the molded electrode, and hot-pressing the electrode and the ion-exchange membrane to join them. JP-A-H03-184266 uses a method which comprises mixing a powder prepared by applying a polymer electrolyte on the surface of Nylon 12 or a styrene-based resin into an electrode, and JP-A-H03-295172 employs a method which comprises mixing a powder of polymer electrolyte into an electrode. JP-A-H05-36418 discloses a method which comprises mixing a polymer electrolyte, a catalyst, a carbon powder and a fluorocarbon resin, and forming the mixture into a film to produce an electrode.

All of the above-mentioned prior arts use alcohol solvents for the dispersion of polymer electrolyte. U.S. Pat. No. 5,211,984 reports a method which comprises preparing an inky dispersion of polymer electrolyte, a catalyst and a carbon powder using glycerin or tetrabutylammonium salt as a solvent, casting the dispersion on a polytetrafluoroethylene (hereinafter referred to as "PTFE") film, and then transferring it onto the surface of a polymer electrolyte membrane; and a method which comprises substituting a sodium atom for a hydrogen atom of a sulfonic acid group of a polymer electrolyte membrane, applying the above inky dispersion on the surface of the membrane, and heating and drying the coat at 125° C. or higher temperature to again substitute H type for the ion-exchanging group.

In order to realize a high output density that is a characteristic of a polymer electrolyte fuel cell, it is important to form a gas channel of a reaction gas in the catalyst layer of the electrode and increase the gas permeating and diffusing performance. Therefore, it has been attempted to form the gas channel by adding a water repellent material such as a fluorocarbon resin to the electrode catalyst layer. For example, JP-A-H05-36418 disperses a PTFE powder and a carbon powder supporting a catalyst into a dispersion of polymer electrolyte and kneads them to form a catalyst layer. Further, JP-A-H04-264367 forms an electrode by using a mixed liquid prepared by mixing a carbon powder supporting a catalyst with a colloidal solution of PTFE.

Moreover, there is a proposed method in which a gas diffusion electrode for an acidic electrolyte is formed by mixing a carbon powder which received water repellent treatment using PTFE with a catalyst-supporting carbon powder (J. Electroanal. Chem., 197 (1988), p. 195). On the other hand, according to the specification of U.S. Pat. No. 5,211,984, the catalyst layer of the electrode is composed only of a polymer electrolyte, a catalyst and a carbon powder, without using a water repellent material as mentioned above.

However, when a catalyst-supporting carbon powder and a water repellent material such as fluorocarbon resin or a carbon powder which received water repellent treatment are simultaneously added to a dispersion of polymer electrolyte, much polymer electrolyte is adsorbed to the water repellent material or the carbon powder which received the water repellent treatment and consequently the degree of contact between the polymer electrolyte and the catalyst becomes insufficient and non-uniform, and thus there is a drawback that a sufficient reaction area can not be ensured at the interface between the electrode and the ion-exchange membrane or the polymer electrolyte membrane.

When an electrode is composed only of a catalyst-supporting carbon powder and a polymer electrolyte, there is a drawback that the cell voltage becomes lower or unstable at high current density due to flooding caused by the generated water.

In order to solve such problems, as disclosed in JP-A-H08-264190, the present inventor et al. tested a method in which a polymer electrolyte is made colloidal and then adsorbed to a catalyst powder. In this method, however, a noble metal catalyst present in pores smaller than the colloidal particles failed to act effectively.

Therefore, it is an object of the present invention to provide a method for producing an electrode exhibiting higher performance by effectively utilizing the merit of forming a porous catalyst layer by making a polymer electrolyte colloidal.

It is another object of the present invention to provide a method for manufacturing a polymer electrolyte fuel cell exhibiting higher performance by sufficiently and uniformly bringing a polymer electrolyte and a catalyst into contact with each other to increase the reaction area inside the electrode.

It is still another object of the present invention to provide a method for manufacturing a polymer electrolyte fuel cell exhibiting higher performance in a high current density region by forming a gas channel in a catalyst layer, without excessively coating the catalyst to increase the gas permeability of the electrode.

DISCLOSURE OF INVENTION

A polymer electrolyte fuel cell of the present invention comprises: a polymer electrolyte membrane; and a pair of electrodes having a catalyst layer on a surface which is in contact with the polymer electrolyte membrane and sandwiching the polymer electrolyte membrane therebetween, wherein the catalyst layer of at least one of the electrodes comprises carbon particles supporting a noble metal catalyst, and the carbon particles include at least two kinds of carbon particles adsorbing a polymer electrolyte in mutually different dispersed states.

The present invention also provides a method for manufacturing a polymer electrolyte fuel cell, comprising the step of preparing at least two kinds of carbon particles adsorbing a polymer electrolyte in mutually different dispersed states. In particular, the present invention provides a method for manufacturing a polymer electrolyte fuel cell, comprising the step of adjusting the particle size of a polymer electrolyte to be adsorbed to carbon particles.

BRIEF DESCRIPTION OF DRAWINGS

FIG. 4 is a view showing a model of polymer electrolyte particles when the dielectric constant of a solvent in which the polymer electrolyte is dispersed is 25 to 80.

FIG. 5 is a view showing a model of polymer electrolyte particles when the dielectric constant of a solvent in which the polymer electrolyte is dispersed is 15 to 25.

FIG. 6 is a view showing a model of polymer electrolyte particles when the dielectric constant of a solvent in which the polymer electrolyte is dispersed is 5 to 15.

FIG. 7 is a concept view showing the positional relationship between agglomerate particles and the polymer electrolyte.

BEST MODE FOR CARRYING OUT THE INVENTION

Figure 1:
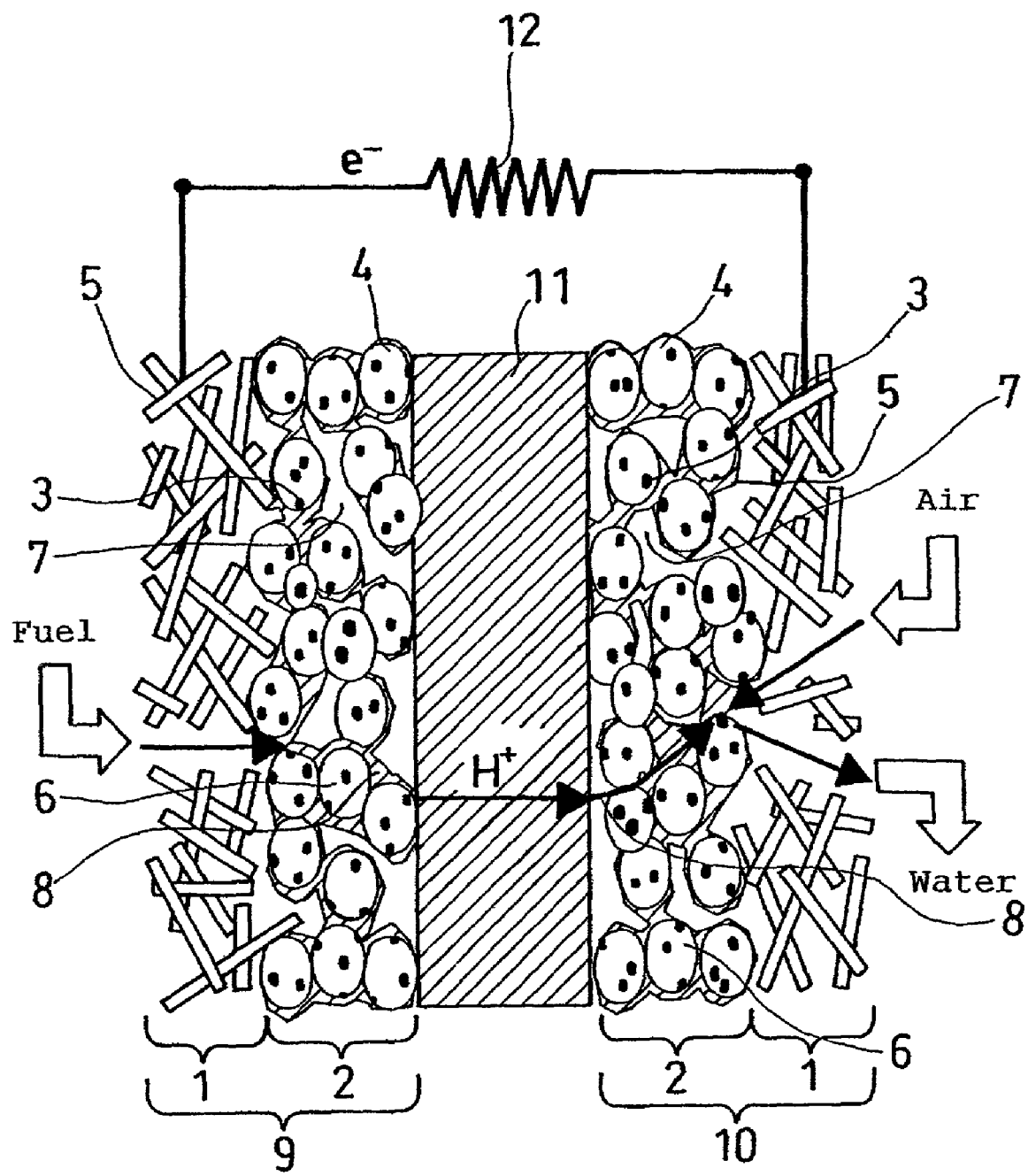
FIG. 1 is a depiction showing a cross section of a membrane-electrode assembly according to the present invention.

An electrode of a polymer electrolyte fuel cell of the present invention comprises a catalyst layer which contains carbon particles supporting a noble metal catalyst, and the carbon particles include at least two kinds of carbon particles adsorbing a polymer electrolyte in mutually different dispersed states. Before adsorption of the polymer electrolyte, the at least two kinds of carbon particles used here may be originally the same particles.

In a preferred embodiment, the at least two kinds of carbon particles used here have mutually different specific surface areas or DBP oil adsorptions. It is preferred to use acetylene black as the carbon particles having a small specific surface area and/or DBP oil adsorption and use furnace black as the carbon particles having a large specific surface area and/or DBP oil adsorption.

The function of optimizing the permeability and diffusibility of a reaction gas is given by the difference in the gas permeability caused by the difference in the structural difference represented by the specific surface area and/or the DBP oil adsorption of the carbon particles.

In another preferred embodiment of the present invention, irrespective of whether the at least two kinds of carbon particles are the same or not, the particle size of the polymer electrolyte adsorbed to these carbon particles differ from each other. Typically, particle sizes of the hydrogen ion conductive polymer electrolytes adsorbed to the first and second carbon particles are within a range of 30 to 200 nm and a range of 200 to 500 nm, respectively, when measured by a light-scattering photometer. A preferred method for adjusting the particle size of the polymer electrolyte to be adsorbed to the carbon particles comprises adding to a first solvent in which a polymer electrolyte is dispersed a second solvent having a dielectric constant different from that of the first solvent in preparing a coating or ink for forming a catalyst layer. The particle size of the polymer electrolyte to be adsorbed to the carbon particles can be adjusted by the dielectric constant of mixed solvent of the first and second solvents and/or the concentration of the polymer electrolyte dispersed in the first solvent.

The present invention also relates to a method for manufacturing a polymer electrolyte fuel cell, comprising the steps of:

(i) adsorbing a polymer electrolyte to first carbon particles supporting a catalyst in a first dispersion in which the polymer electrolyte is dispersed;

(ii) adsorbing a polymer electrolyte to second carbon particles supporting a catalyst in a second dispersion in which the polymer electrolyte is dispersed;

(iii) preparing a catalyst layer ink by mixing the first and second dispersions; and (iv) forming a catalyst layer from the catalyst layer ink; and further comprising the step of (v) adjusting the particle size of the polymer electrolyte by mixing a first solvent in which the polymer electrolyte is dispersed with a second solvent having a dielectric constant different from that of the first solvent before adsorbing the polymer electrolyte to the carbon particles in at least one of the first and second dispersions.

In a preferred embodiment of the above-described manufacturing method, the solvent of the first dispersion is a mixture of an alcohol and a second solvent having no hydroxyl group, and the step of adjusting the particle size of the polymer electrolyte is implemented by mixing an alcohol dispersion of the polymer electrolyte with the second solvent in which the first carbon particles are dispersed.

From another point of view, the above-described preferred embodiment is a method for manufacturing a polymer electrolyte fuel cell, comprising the steps of:

(a) preparing a dispersion by dispersing first carbon particles supporting a noble metal catalyst in an organic solvent having no hydroxyl group;

(b) mixing the dispersion with an alcohol dispersion of polymer electrolyte to generate a colloid of the polymer electrolyte and prepare a mixed liquid containing the colloid adsorbed to the carbon particles;

(c) mixing second carbon particles supporting a noble metal catalyst with an alcohol dispersion of a solid polymer electrolyte to prepare a dispersion;

(d) mixing the mixed liquid prepared in the step (b) with the dispersion obtained in the step (c) to prepare a catalyst layer ink; and (e) forming a catalyst layer from the catalyst layer ink obtained in the step (d).

To explain more specifically the step of forming the catalyst layer from the catalyst layer ink to produce a membrane-electrode assembly, the step (iv) or (e) of the first embodiment is the step of forming a catalyst layer by applying the catalyst layer ink on one of the surfaces of a gas diffusion layer and whereby producing an electrode, and the first embodiment further comprises the step of integrally joining the produced electrode to at least one of the surfaces of the polymer electrolyte membrane by application of pressure.

The step (iv) or (e) of the second embodiment is the step of forming a catalyst layer by applying the catalyst layer ink on at least one of the surfaces of the polymer electrolyte membrane and thereby forming a membrane-catalyst layer assembly, and the second embodiment further comprises the step of integrally joining a gas diffusion layer to the catalyst layer side of the membrane-catalyst layer assembly by application of pressure.

The step (iv) or (e) of the third embodiment is the step of forming a catalyst layer by applying the catalyst layer ink on a transfer film and the step of forming a membrane-catalyst layer assembly by transferring the catalyst layer to at least one of the surfaces of a polymer electrolyte membrane, and the third embodiment further comprises the step of integrally joining a gas diffusion layer to the catalyst layer side of the membrane-catalyst layer assembly by application of pressure.

The first carbon particles in the catalyst layer ink of the present invention support a noble metal catalyst thereon in advance, and, after the first carbon particles are dispersed in an organic solvent, the colloid of the polymer electrolyte is adsorbed thereto in the step (b). Thus, since the polymer electrolyte is adsorbed to the catalyst-supporting carbon particles in a highly dispersed state, it is possible to ensure a porous state without clogging the pores of the carbon particles. Moreover, in the step (c) of preparing a dispersion by mixing the second carbon particles supporting a noble metal catalyst with an alcohol dispersion of polymer electrolyte, the polymer electrolyte is adsorbed to the catalyst-supporting carbon particles without making the polymer electrolyte into a colloidal state. Therefore, the polymer electrolyte can be adsorbed more densely to the catalyst particles in minute pores.

As a result, as shown by depiction of a cross section of an electrode in FIG. 1, in a catalyst layer 2 of the electrode, it is possible to bring the fine particles 3 of the catalyst, carbon particles 4 and a polymer electrolyte 5 into close contact with each other uniformly while ensuring sufficient gas passage.

According to such a construction of the catalyst layer 2, three channels: a gas channel 7 formed by the void between the carbon particles 4 as a passage for supplying a fuel gas such as hydrogen and liquid fuel, or an oxidant gas such as oxygen; a proton channel 8 formed by the polymer electrolyte 5 containing water; and an electron channel 6 formed by mutual connection of the carbon particles, can be efficiently formed very close to each other inside the same catalyst layer. In FIG. 1, 1 is a gas diffusion layer, 9 is a fuel electrode, 10 is an oxygen electrode, and 11 is a polymer electrolyte membrane.

Accordingly, the supply of hydrogen and an oxygen gas and the transfer of proton and electron are simultaneously and smoothly carried out over a wide range in the fuel electrode by a reaction shown by the formula (1), and in the oxygen electrode by a reaction shown by the formula (2). Consequently, the reaction rate and the reaction area are increased, and a polymer electrolyte fuel cell exhibiting higher discharge performance can be realized.

$$H_2 \rightarrow 2H^+ + 2e^- \qquad (1)$$

$$\tfrac{1}{2}O_2 + 2H^+ + 2e^- \rightarrow 2H_2O \qquad (2)$$

Figure 3:
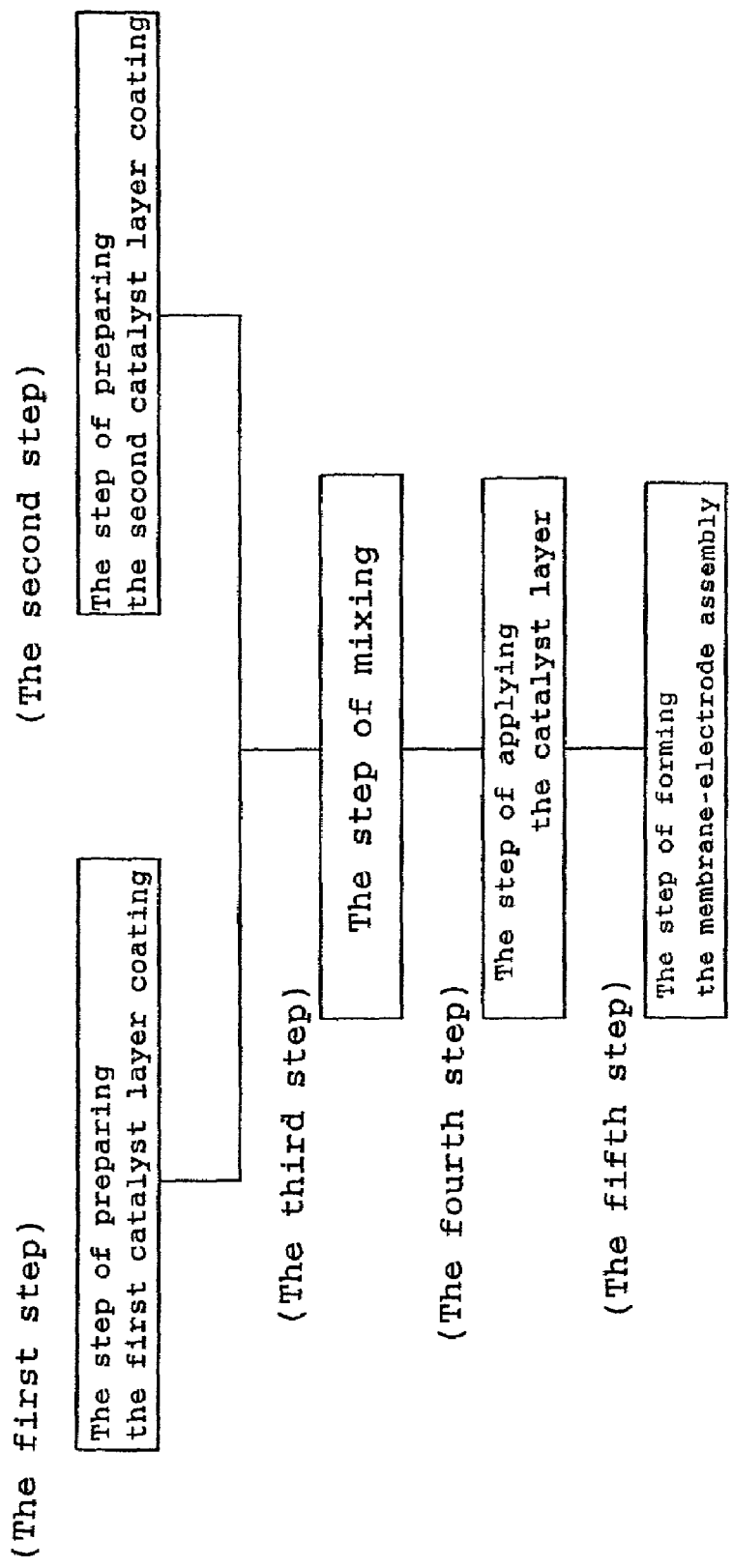
FIG. 3 is a block diagram showing the steps of manufacturing a polymer electrotype fuel cell according to an example of the present invention.

The process of manufacturing a polymer electrolyte fuel cell of the present invention is shown in FIG. 3.

First, in the first step, catalyst particles are prepared by causing first carbon particles having a specific surface area of 30 to 400 $m^2/g$ and a DBP oil adsorption of 150 to 250 ml/100 g to support a noble metal catalyst such as Pt and a binary catalyst of Pt—Ru. The resultant catalyst particles are dispersed in an organic solvent having a dielectric constant of 3 to 10, for example, butyl acetate to prepare a dispersion.

Subsequently, this dispersion is mixed with an alcohol dispersion of polymer electrolyte, for example, "9% FSS solution" (trade name) manufactured by Asahi Glass Co., Ltd. and "5% Nafion solution" (trade name) manufactured by Aldrich Chemical Co., Ltd. in U.S.A. to produce a colloid of the polymer electrolyte and prepare a mixed liquid containing the colloid adsorbed to the carbon particles.

In the second step, catalyst particles are prepared by causing second carbon particles having a specific surface area of 400 to 1600 $m^2/g$ and a DBP oil adsorption of 250 to 500 ml/100 g to support a noble metal catalyst such as Pt and a binary catalyst of Pt—Ru. The resultant catalyst particles are dispersed in an alcohol dispersion of polymer electrolyte, for example, "9% FSS solution" (trade name) manufactured by Asahi Glass Co., Ltd. and "5% Nafion solution" (trade name) manufactured by Aldrich Chemical Co., Ltd. in U.S.A. to prepare a dispersion.

In the third step, the mixed liquid and the dispersions prepared in the first and second steps are mixed in an arbitrary ratio to produce a catalyst layer ink.

In the fourth step, a catalyst layer is formed by applying the catalyst layer ink.

In order to form this catalyst layer and produce an electrolyte membrane-electrode assembly, the following three methods are mainly used.

In the first method, the catalyst layer is formed on a gas diffusion layer by applying the catalyst layer ink on one of the surfaces of the gas diffusion layer. Consequently, an electrode comprising the gas diffusion layer and the catalyst layer is produced, and this electrode is integrally joined to at least one of the surfaces of the polymer electrolyte membrane by application of pressure, thereby constructing the membrane-electrode assembly.

In the second method, the catalyst layer is formed by applying the catalyst layer ink on at least one of the surfaces of a polymer electrolyte membrane, for example, "Nafion membrane" (trade name) manufactured by E.I. du Pont de Nemours and Company in U.S.A. or "GORESELECT membrane" (trade name) manufactured by Japan Gore-Tex Inc. Consequently, a membrane-catalyst layer assembly is produced, and this membrane-catalyst layer assembly is integrally joined to one of the surfaces of a gas diffusion layer by application of pressure.

According to this method, by integrally forming the joined interface between the polymer electrolyte membrane and the polymer electrolyte in the electrode, the supply of a reaction gas and the transfer of proton and electron are performed simultaneously and smoothly over a wide range.

Therefore, the reaction rate and the reaction area are increased, and a polymer electrolyte fuel cell exhibiting higher discharge performance can be realized.

In the third method, the catalyst layer is formed by applying the catalyst layer ink on a transfer film, for example, a film of polyethylene terephthalate or polypropylene. This catalyst layer is transferred to at least one of the surfaces of a polymer electrolyte membrane to form a membrane-catalyst layer assembly, and then this membrane-catalyst layer assembly is integrally joined to one of the surfaces of a gas diffusion layer by application of pressure.

In this method, since the catalyst layer ink is applied on the transfer film, it is possible to form a dense and uniform catalyst layer efficiently without causing coating defects such as swelling and deformation of the polymer electrolyte due to the action of the solvent in the ink.

It is preferred that the first carbon particles and the second carbon particles used here have a difference in the specific surface area. Specifically, the first carbon particles with a small specific surface area generally have large primary particles and form a relatively large pore channel, while the second carbon particles with a large specific surface area generally have small primary particles and developed structure and, in some occasion, also have minute pores in the primary particles, and thus form a relatively small pore channel. When there is a difference in the DBP oil adsorption between the first carbon particles and the second carbon particles, the first carbon particles with a small DBP oil adsorption form a relatively large pore channel because the structure does not develop much and the primary particles are large, while the second carbon particles with a large DBP oil adsorption have small primary particles and thus form a relatively small pore channel. The reaction gas is quickly and roughly supplied to the entire catalyst layer through the large pore channel, and the reaction gas is supplied to every nook and corner of the catalyst layer through the small pore channel.

When the polymer electrolyte is adsorbed to the first carbon particles supporting the catalyst through a colloidal state, a relatively large proton channel of the polymer electrolyte is formed. On the other hand, when the polymer electrolyte is densely adsorbed as it is to the second carbon particles supporting the catalyst, a relatively small proton channel is formed. A catalyst layer having an extremely low ion resistance is made by quickly passing proton from a reaction site of every corner of the catalyst layer through this small proton channel and conducting proton through the large proton channel.

It is preferred to use acetylene black as carbon particles having a high conductivity, and various kinds of furnace black, such as ketjen black manufactured by Ketjen Black International Co. and VULCAN manufactured by Cabot Corporation in U.S.A. as carbon particles having a large specific surface area.

As the organic solvent used in the step (a) of the present invention, i.e., as the organic solvent for generating a colloid of the polymer electrolyte, n-butyl acetate was used as a typical example of esters in the following examples, but solvents having an ester group in a molecule and a carbon chain having 1 to 7 carbons are applicable. The same effects are also obtained using, for example, propyl formate, butyl formate, isobutyl formate, ethyl acetate, propyl acetate, isopropyl acetate, allyl acetate, isobutyl acetate, pentyl acetate, isopentyl acetate, methyl propionate, ethyl propionate, propyl propionate, methyl acrylate, butyl acrylate, isobutyl acrylate, methyl butyrate, methyl isobutyrate, ethyl butyrate, ethyl isobutyrate, methyl methacrylate, propyl butyrate, isopropyl isobutyrate, 2-ethoxyethylethyl acetate and 2-(2 ethoxyethoxy)ethyl acetate alone or a mixture thereof.

As typical examples of ethers, solvents having an ether group in a molecule and a carbon chain having 3 to 5 carbons are used as well as tetrahydrofuran. The same effects are also obtained using, for example, dipropyl ether, dibutyl ether, ethylene glycol dimethyl ether, ethylene glycol diethyl ether, tripropylene glycol monomethyl ether and tetrahydropyran alone or a mixture thereof.

As typical examples of ketones, solvents having a ketone group in a molecule and a carbon chain having 4 to 8 carbons are used as well as methyl amyl ketone. The same effects are also obtained using, for example, methyl butyl ketone, methyl isobutyl ketone, methyl hexyl ketone and dipropyl ketone alone or a mixture thereof.

As typical examples of amines, solvents having an amino group in a molecule and a carbon chain having 1 to 5 carbons are used as well as n-butyl amine. The same effects are also obtained using, for example, isopropyl amine, isobutyl amine, tert-butyl amine, isopentyl amine and diethyl amine alone or a mixture thereof. Moreover, as typical examples of organic solvents of carboxylic acids, solvents having a carboxyl group in a molecule and a carbon chain having 1 to 6 carbons are used as well as n-butyric acid. The same effects are also obtained using, for example, acetic acid, propionic acid, valeric acid, caproic acid and heptanoic acid alone or a mixture thereof.

Regarding the amount of the organic solvent to be added, it is preferred to select an amount that produces finer colloidal dispersion, for example, 0.3 to 50 times of the alcohol.

As the polymer electrolyte, a copolymer of tetrafluoroethylene and perfluorovinyl ether represented by the following formula (3) was used in the following examples, but the polymer electrolyte is not necessarily limited to this copolymer if it has a proton exchange group. For example, it is possible to use hydrocarbon-based polymer electrolytes such as perfluorovinyl ethers, polymers of different side chain molecular length, and polymers including a copolymer of styrene and vinyl benzene.

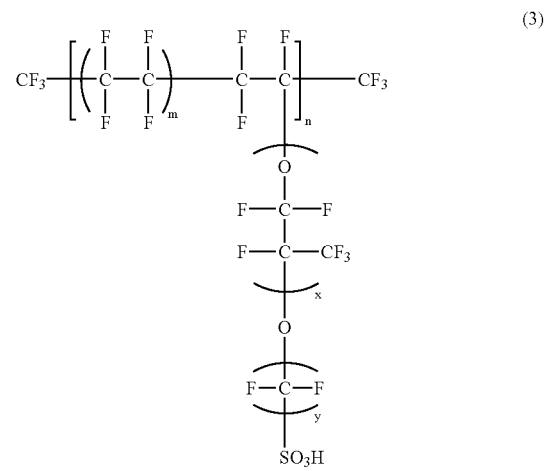

(3)

where, x=1 to 3, y=1 to 5, m=5 to 13.5, n≈1000.

Next, the following description will explain the adjustment of the particle size of the polymer electrolyte to be adsorbed to the carbon particles.

FIGS. 4, 5 and 6 show models of polymer electrolyte to be adsorbed to the carbon particles. In these figures, 50 represents the hydrophilic group of the side chain, and 51 shows the hydrophobic group of the side chain. FIGS. 4, 5 and 6 show the models of polymer electrolyte particles when the solvents in which the polymer electrolyte is dispersed have the dielectric constant of 25 to 80, 15 to 25, and 5 to 15, respectively. The polymer electrolyte produces particles having the hydrophilic group on the outside in FIG. 4, but produces particles having the hydrophobic group on the outside in FIG. 6. In FIGS. 4 and 6, (a) indicates the polymer electrolyte having a particle size of about 30 nm, while (b) shows the polymer electrolyte having a particle size of about 200 nm. As described above, a preferred method for adjusting the particle size of the polymer electrolyte to be adsorbed to the carbon particles is a method which comprises adding to the first solvent in which the polymer electrolyte is dispersed the second solvent having a dielectric constant different from that of the first solvent in preparing an ink for forming the catalyst layer. When the concentration of the polymer electrolyte in the first solvent is low, colloidal particles having a small particle size are produced as shown in (a) of FIGS. 4 and 6, while, when the concentration of the polymer electrolyte in the first solvent is high, colloidal particles having a relatively large particle size are produced as shown in (b) of FIGS. 4 and 6. As shown in FIG. 5, when the dispersion medium has a dielectric constant of 15 to 25, the polymer electrolyte does not condense and has a size of around 300 nm.

By adjusting the particle size of the polymer electrolyte that are to be adsorbed to the carbon particles, it is possible to bring the catalyst particles and the polymer electrolyte into contact with each other satisfactorily and increase the reaction area of the catalyst.

The carbon particles have an aggregate structure in which the primary particles are unitarily bound together, or an agglomerate structure in which they physically or just secondarily gather together. The carbon particles that are generally used in this type of fuel cells form a 100 to 1000 nm agglomerate particle by further aggregation of the aggregate structures comprising 10 to 50 nm primary particles. Hence, the carbon particles 4 shown in FIG. 1 are agglomerate particles.

FIG. 7 is a concept view showing the positional relationship between the agglomerate particle and the polymer electrolyte. FIG. 7(a) shows a preferred structure, and (b) illustrates a conventional structure. In the conventional structure (b), the carbon particles form a 100 to 1000 nm agglomerate particle 22 which is obtained by further aggregation of the aggregate structures comprising 10 to 50 nm primary particles 21 and has a 10 nm to 200 nm pore 23. In the case where a polymer electrolyte 26 of conventionally used perfluorocarbon sulphonic acid ionomer having a polymerization degree of about 1000 is used, since the size of the polymer electrolyte 26 is 300 to 400 nm which is comparatively larger than the pore 23 of the agglomerate particle 22, the polymer electrolyte 26 can not come into contact with many catalyst particles 25 supported inside the pores.

On the other hand, if a polymer electrolyte 24 in a dispersion has a small size of 10 to 200 nm when adsorbed to the carbon particles though it has the same molecular weight and degree of polymerization, as shown in FIG. 7(a), the polymer electrolyte 24 can enter into the 10 to 200 nm pores 23 inside the agglomerate particles 22 and can come into contact with the catalyst 25. Accordingly, the reaction area of the catalyst is significantly increased as compared to the conventional structure, and the discharge characteristics of the fuel cell are improved.

At least two kinds of carbon particles to which the polymer electrolyte in mutually different dispersed states are adsorbed may include both the structures of FIGS. 7(a) and (b), or may include the structure of FIG. 7(a) that have different specific surface area the carbon particles of and/or of the polymer electrolyte particle size adsorbed to the carbon particles.

The carbon particles for use in the catalyst layer form a chain-like aggregate by further bonding of the primary particles having a specific surface area of several 10 to several 1000 $m^2/g$ and a particle size of several 10 nm. Therefore, the catalyst layer ink produced by mixing the polymer electrolyte and its dispersion medium, etc. with the carbon particles is very easy to aggregate and realizes a particle size distribution with a median diameter of several 10 μm by a normal stirring and dispersing method such as a stirrer and an ultrasonic bath.

Hence, when a several μm to several 10 μm catalyst layer is coated on an electrolyte membrane, a diffusion layer, a transfer film or the like, a layer of aggregates of several 10 μm carbon particles is formed, and thus coating of a thin film less than the aggregates of several 10 μm is difficult and a dense and smooth coating film is not obtained.

The present invention provides means for solving such problems. More specifically, the preparation process of the catalyst layer ink additionally includes a dispersing step for dispersing the catalyst-supporting carbon particles in the ink so as to have a particle size distribution within a median diameter range of 0.1 to 3 μm.

In this dispersing step, it is preferred to use bead mill. The bead mill stirs fine beads of not larger than several μm, for example, 0.5 μm zirconia beads and the catalyst layer ink with the stirring force of a high-speed rotor, and grinds the carbon particles by the collision between the beads and the material and a shear force caused by the beads. If the gap between the rotor and stator is made smaller than the bead size, it is possible to separately discharge the catalyst layer ink and the beads and continuously disperse the material. By reintroducing or circulating the discharged ink, it is possible to further promote the dispersion. With this dispersing step, the median diameter in the particle size distribution of the solid components in the catalyst layer ink can be made within the range of 0.1 to 3 μm.

The catalyst layer obtained by applying the catalyst layer ink dispersed in such a manner becomes a dense and smooth coating film. The 85° glossiness of the surface of such a catalyst layer given by an evaluation method according to JIS Z8741 is not less than 20%, preferably 50 to 95%. It can be confirmed by this glossiness that the denseness and smoothness of the catalyst layer surface have been improved.

Figure 8:
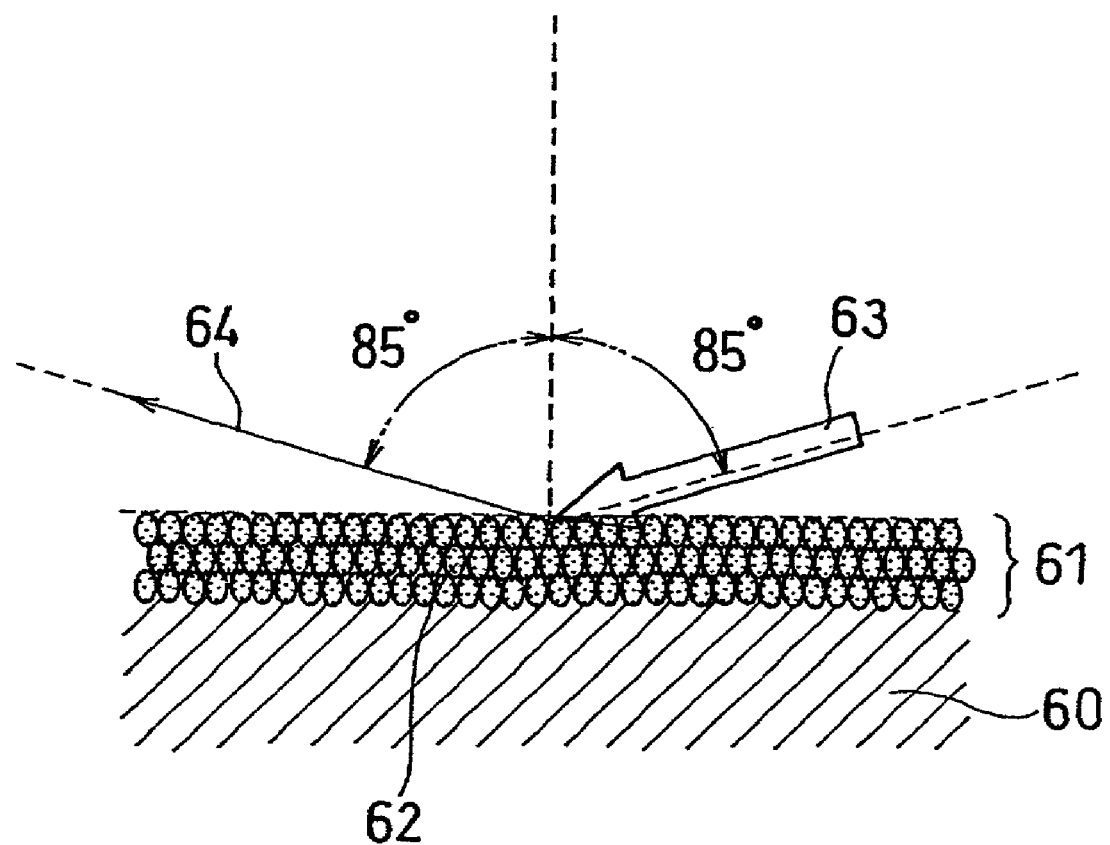
FIG. 8 is a view showing a model when a catalyst layer which is coated in a film thickness of about 10 μm on a support body is made of a layer of 0.1 to 3 μm particles.

FIG. 8 shows a model of an example in which a catalyst layer 61 coated in a film thickness of about 10 μm on a support body 60 is made of a layer of 0.1 to 3 μm particles 62. In this catalyst layer, the void between the particles is small, and the catalyst layer is formed as a dense layer. As the glossiness of the catalyst layer, light 63 incident on a surface perpendicular to the catalyst layer at an angle of 85° is reflected by the dense catalyst layer surface, and light 64 reflected from the surface perpendicular to the catalyst layer at an angle of 85° shows a high received-light intensity. The support body 60 is a polymer electrolyte membrane, a gas diffusion layer or a transfer film.

For the catalyst of the fuel electrode, it is preferred to alloy the Pt catalyst with Ru, Mo, Ni, Fe or the like in order to remove carbon monoxide mixed in the fuel by oxidation. For the alloying, after causing individual metals to be supported on the carbon particles, they are subjected to heat treatment at a temperature of 200 to 1000° C. under an inert gas or reducing gas atmosphere. With the heat treatment, the functional group in the surface of the carbon particles as a catalyst carrier is removed, and the hydrophilicity of the catalyst-supporting carbon particles is lowered. When the hydrophillicity is lowered, the cohesiveness of the carbon particles in the catalyst layer ink increases. As a result, the effect of the above-described dispersing step is reduced, and a dense and smooth coating film is not obtained.

Against this problem, it is preferred to apply hydrophilicity treatment to the carbon particles after causing the catalyst to be supported thereon but before preparing the catalyst ink. This hydrophilicity treatment can be executed using at least one kind of oxidizing agent selected from hydrogen peroxide, sodium hypochlorite, potassium permanganate, hydrochloric acid, nitric acid, phosphoric acid, sulfuric aid, hydrofluoric acid, acetic acid and ozone. With this hydrophilicity treatment, the surface functional groups such as the OH group, COOH group, CHO group and CO group lost in the step of heat treating the alloy catalyst can be generated on the carbon particle surface. Consequently, it becomes possible to increase the affinity with water, alcohol and other organic solvent used for the catalyst layer ink, reduce the cohesion of the carbon particles and limit re-aggregation after the dispersing step.

As mentioned above, for the formation of the catalyst layer from the catalyst layer ink prepared in the above-described manner, there are a method in which the catalyst layer ink is directly applied on the polymer electrolyte membrane or the gas diffusion layer and a method in which the catalyst layer is formed by applying the catalyst layer ink on the transfer film and then transferred to the polymer electrolyte membrane. During the formation of the catalyst layer as described above, if the affinity between the catalyst layer ink and the polymer electrolyte membrane, etc. is not satisfactory, the ink is repelled, and thus it is difficult to form a uniform coating film. In the case where the catalyst layer is formed on the transfer film and then transferred to the polymer electrolyte membrane, it is necessary to have not only satisfactory applying performance but also satisfactory transferability of the catalyst layer to the polymer electrolyte membrane.

In the present invention, the surface tension of the dispersion medium in the catalyst layer ink comprising the catalyst-supporting carbon particles, polymer electrolyte membrane and dispersion medium is made smaller than the critical surface tension of the polymer electrolyte membrane, gas diffusion layer or transfer sheet on which the catalyst layer ink is to be coated. In the case where the catalyst layer is formed on the transfer sheet and then transferred to the polymer electrolyte membrane, the critical surface tension of the catalyst layer formed on the transfer sheet is preferably smaller than the critical surface tension of the polymer electrolyte membrane. The critical surface tension of the transfer sheet is preferably from 20 to 45 dyne/cm, and one selected from the group consisting of polyethylene, polypropylene, polyethylene terephthalate and polycarbonate is preferable.

It has been considered that the wettability of the solid surface is determined by the relationship between the surface tensions of solid and liquid. More specifically, when the surface tension ($\gamma_L$) of the liquid is smaller than the critical surface tension ($\gamma_C$) of the solid ($\gamma_L < \gamma_C$), the solid surface is readily wet by the liquid. On the other hand, when $\gamma_C < \gamma_L$, a phenomenon in which the solid surface repels the liquid is seen. By controlling the wettability of the polymer electrolyte membrane or the transfer sheet within a suitable range, it is possible to improve the applying performance of the catalyst layer ink and easily perform the transfer of the catalyst layer.

In the case where the catalyst layer ink is applied on the polymer electrolyte membrane, the critical surface tension of the polymer electrolyte membrane is preferably 1.2 times greater than the surface tension of the dispersion medium in the ink. In the case where the catalyst layer is formed by the application of the ink to the transfer sheet and then transferred to the polymer electrolyte membrane, the lower the critical surface tension of the transfer sheet, the more easily the catalyst layer is transferred. However, although a high critical surface tension of the transfer sheet improves the applying performance of the ink, it is not necessarily that the higher the critical surface tension of the transfer sheet, the better the results is obtained. Thus, a preferred critical surface tension of the transfer sheet is not smaller than 1.1 times the surface tension of the dispersion medium in the ink.

The following description will explain examples of the present invention.

EXAMPLE 1

First, the first carbon particles, acetylene black (DENKA BLACK manufactured by Denki Kagaku Kogyo K. K.), having a specific surface area of 68 $m^2/g$ and a DBP oil adsorption of 175 ml/100 g were caused to support 40% by weight of a platinum catalyst. The resulting catalyst particles were dispersed in butyl acetate to prepare a dispersion. This dispersion and an alcohol dispersion of polymer electrolyte ("9% FSS solution" (trade name) manufactured by Asahi Glass Co., Ltd.) were mixed in a weight ratio of 1:1.15 to produce a colloid of the polymer electrolyte and prepare a mixed liquid containing the carbon particles adsorbing the colloid.

Meanwhile, the second carbon particles, ketjen black (Ketjen Black EC manufactured by Ketjen Black International Co.), having a specific surface area of 800 $m^2/\mu g$ and a DBP oil adsorption of 360 ml/100 g were caused to support 50% by weight of a platinum catalyst. The resulting catalyst particles were dispersed in an alcohol dispersion of polymer electrolyte ("9% FSS solution" (trade name) manufactured by Asahi Glass Co., Ltd.) to obtain a dispersion. At this time, in order to prevent firing of the catalyst particles, it is preferred to add water to wet the catalyst particles in advance.

The mixed liquid and the dispersion were mixed in a weight ratio of 1:2 to produce a catalyst layer ink.

Next, an electrode was produced by applying the catalyst layer ink on one of the surfaces of a gas diffusion layer carbon paper (Carbon Paper TGPH-060 manufactured by Toray Industries, Inc.) so that the amount of platinum was 0.3 $mg/cm^2$. A polymer electrolyte membrane (Nafion 112 membrane manufactured by E. I. du Pont de Nemours and Company) was sandwiched between a pair of electrodes thus produced so that the catalyst layers were placed inside, and these three members were integrally joined by application of a pressure of 4 $MPa/cm^2$ at 150° C. to prepare a membrane-electrode assembly. Cell A was assembled using this membrane-electrode assembly.

EXAMPLE 2

A membrane-catalyst layer assembly was formed by applying the same catalyst layer ink as in Example 1 on both surfaces of a polymer electrolyte membrane (Nafion 112 membrane manufactured by E. I. du Pont de Nemours and Company). Subsequently, cell B was assembled in the same manner as in Example 1, except that a gas diffusion layer carbon paper (Carbon Paper TGPH-060 manufactured by Toray Industries, Inc.) was integrally joined to both surfaces of this membrane-catalyst layer assembly by application of a pressure of 4 MPa/cm$^2$ at 150° C. to form a membrane-electrode assembly.

EXAMPLE 3

A catalyst layer was formed by applying the same catalyst layer ink as in Example 1 on a surface of a transfer film made of polypropylene. This catalyst layer was transferred to both surfaces of a polymer electrolyte membrane ("GORESE-LECT membrane" manufactured by Japan Gore-Tex Inc.) by application of a pressure of 2 MPa/cm$^2$ at 130° C. to prepare a membrane-catalyst layer assembly. A gas diffusion layer carbon paper (Carbon Paper TGPH-060 manufactured by Toray Industries, Inc.) was integrally joined to both of the catalyst layers of this membrane-catalyst layer assembly by application of a pressure. Thus, a membrane-electrode assembly was formed, and cell C was assembled.

EXAMPLE 4

Cell D was assembled by forming a membrane-electrode assembly in the same manner as in Example 1, except that ketjen black (Ketjen Black EC600JD manufactured by Ketjen Black International Co.) having a specific surface area of 1270 m$^2$/g and an oil adsorption of 495 ml/100 g was used as the second carbon particles.

EXAMPLE 5

Cell E was assembled by forming a membrane-electrode assembly in the same manner as in Example 1, except that carbon particles (VULCAN XC-72 manufactured by Cabot Corporation) having a specific surface area of 254 m$^2$/g and an oil adsorption DBP of 174 ml/100 g were used as the first carbon particles.

COMPARATIVE EXAMPLE 1

Cell X was assembled by forming a membrane-electrode assembly in the same manner as in Example 1, except that the catalyst layer ink was prepared using only the mixed liquid containing the first carbon particles of Example 1.

COMPARATIVE EXAMPLE 2

Cell Y was assembled by forming a membrane-electrode assembly in the same manner as in Example 1, except that the catalyst layer ink was prepared using only the dispersion containing the second carbon particles of Example 1.

Figure 2:
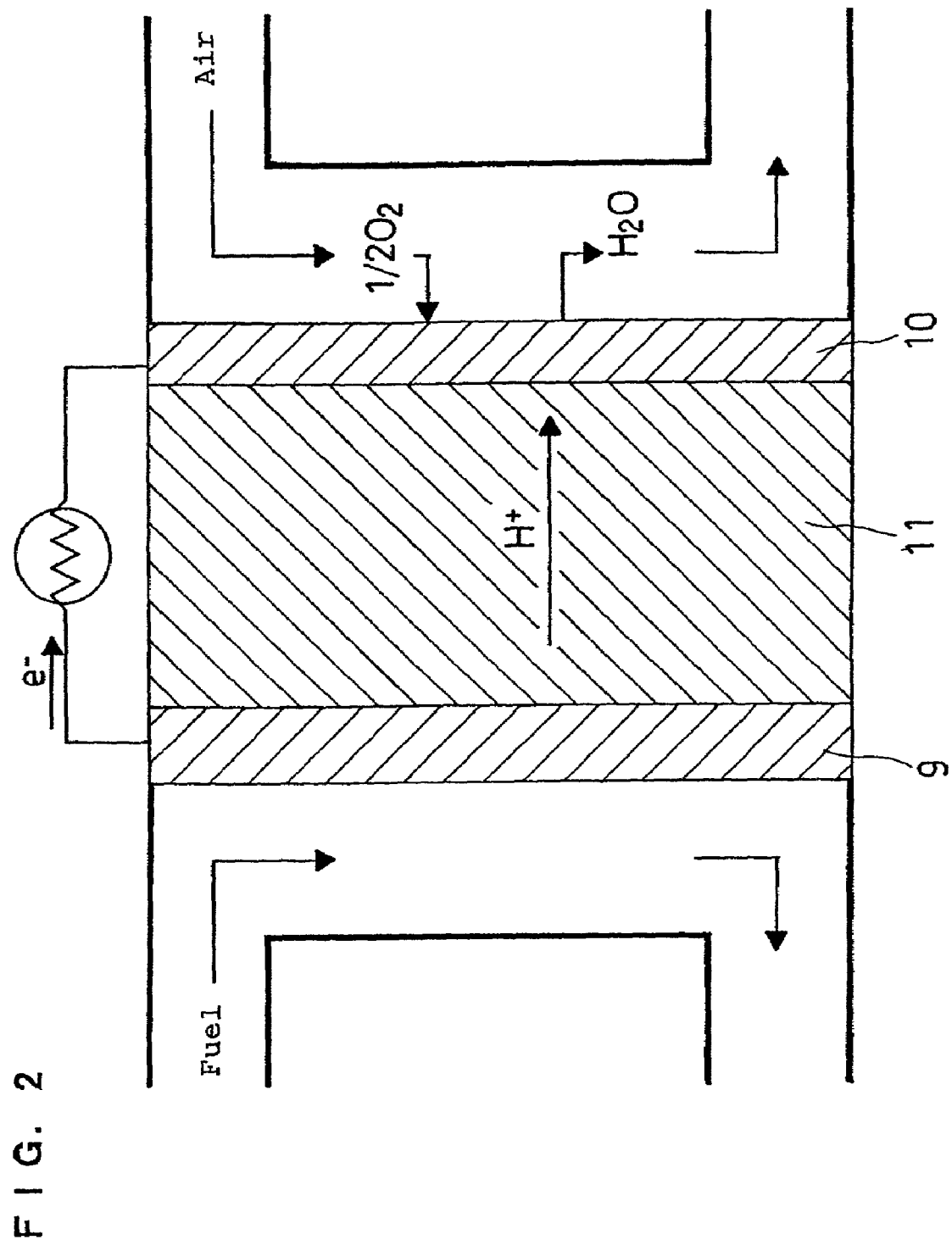
FIG. 2 is a schematic cross sectional view of a unit cell of a fuel cell subjected to an experiment.

The current-voltage characteristics were evaluated for the cells A to E of Examples 1 to 5 and the cells X and Y of the comparative examples. As shown in FIG. 2, each cell is composed of a membrane-electrode assembly comprising a polymer electrolyte membrane 11, a fuel electrode 9 joined to one of the surfaces of the polymer electrolyte membrane 11, and an air electrode 10 joined to the other surface of the electrolyte membrane 11. A hydrogen gas humidified and heated to a dew point of 70° C. was supplied to the fuel electrode, while the air humidified and heated to a dew point of 60° C. was supplied to the oxidant electrode. Then, each cell was operated at a hydrogen utilization ratio of 70% and an air utilization ratio of 40% while maintaining the cell temperature at 75° C.

Figure 9:
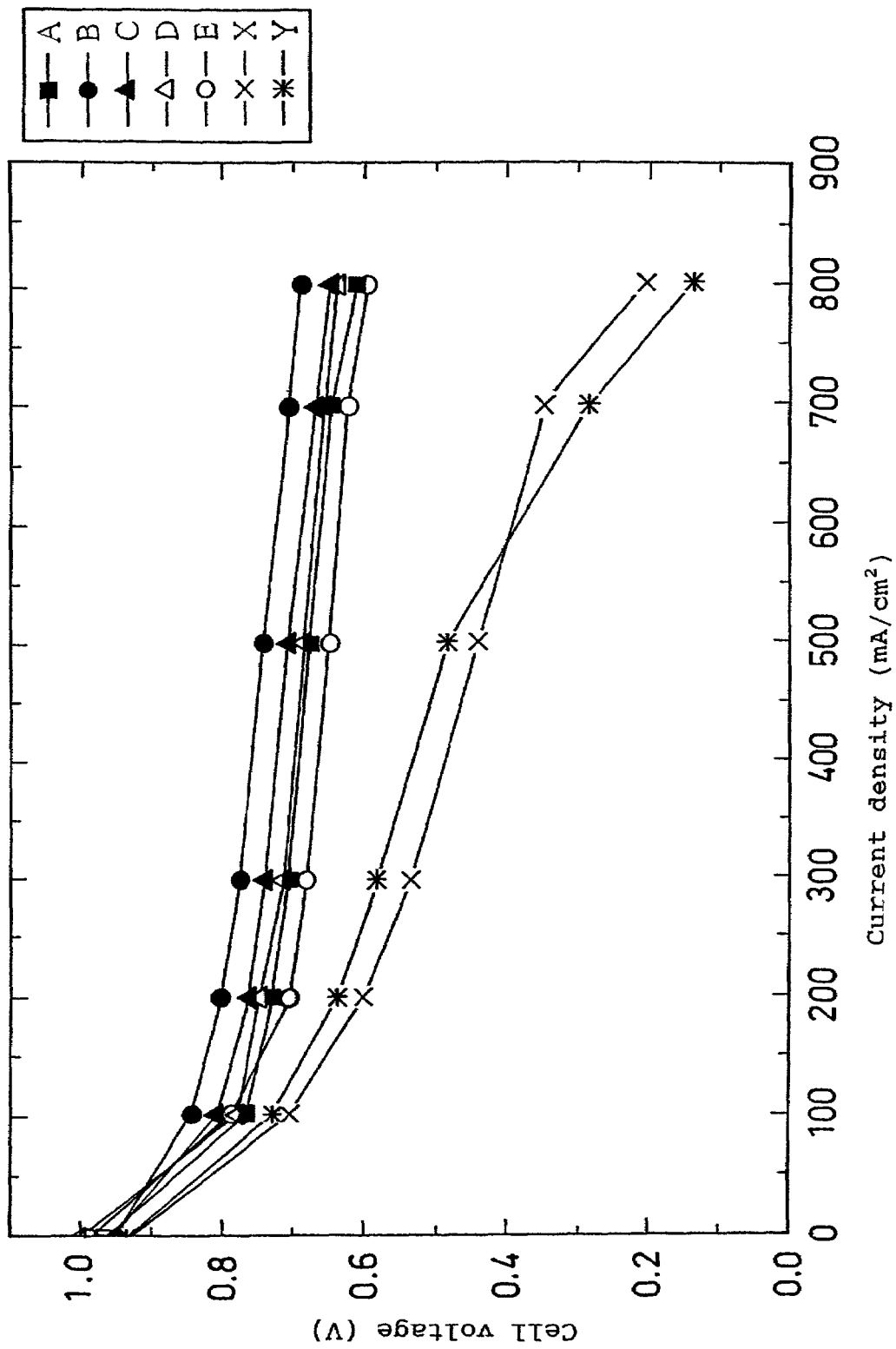
FIG. 9 is a view showing the current-voltage characteristics of fuel cells of examples and comparative examples when a hydrogen gas was used as a fuel.

FIG. 9 shows the current-voltage characteristics of the respective cells. The cells A to E of the present invention exhibited cell voltages of 0.645 V, 0.707 V, 0.668 V, 0.698 V and 0.645 V, respectively, at a current density of 700 mA/cm$^2$.

On the other hand, the cells X and Y of the comparative examples exhibited cell voltages of 0.347 V and 0.284 V, respectively, at a current density of 700 mA/cm$^2$.

It was found from the results of the polarization tests of the respective cells that each of the cells according to the present invention exhibited improved characteristics compared to the cells of the comparative examples.

As described above, by adsorbing the colloidal particles of the polymer electrolyte to the first carbon particles (the specific surface area was from 30 to 400 m$^2$/g) and adsorbing the polymer electrolyte which was not made colloidal particles to the second carbon particles (the specific surface area was from 400 to 1600 m$^2$/g), high-performance electrodes with a large reaction active area were realized.

Figure 10:
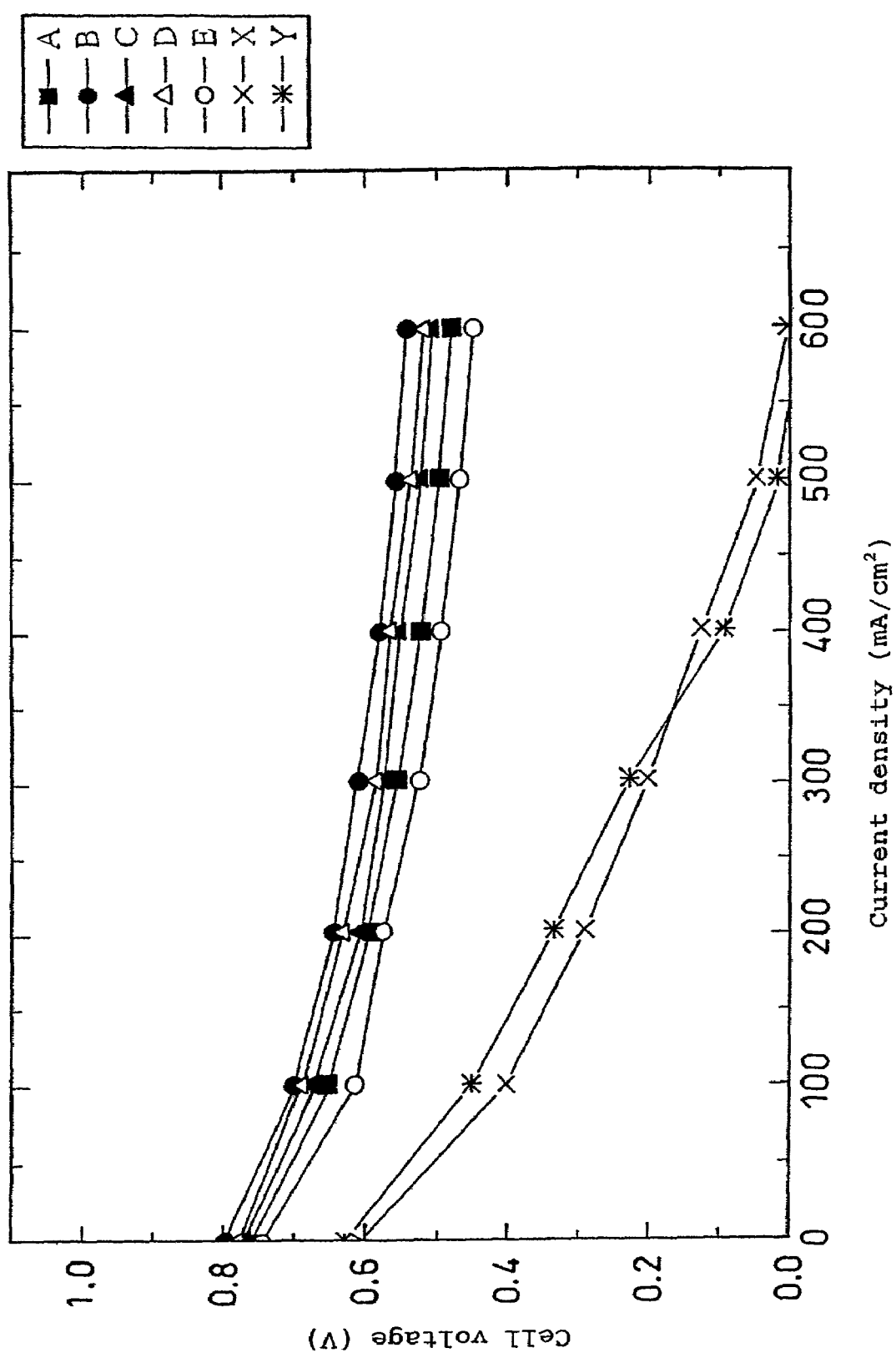
FIG. 10 is a view showing the current-voltage characteristics of fuel cells of examples and comparative examples when an aqueous methanol solution was used as a fuel.

FIG. 10 shows the voltage-current characteristics of direct methanol fuel cells obtained by supplying 2 mol/l aqueous methanol solution as a typical example of liquid fuel to the fuel electrodes of the respective cells at 60° C., in place of the above-mentioned hydrogen. The cells A to E of the present invention exhibited cell voltages of 0.595 V, 0.644 V, 0.608 V, 0.631 V and 0.574 V, respectively, at a current density of 200 mA/cm$^2$. On the other hand, the cells X and Y of the comparative examples exhibited cell voltages of 0.289 V and 0.334 V, respectively, at a current density of 200 mA/cm$^2$.

It was found from the results of the polarization tests of the above-described cells that each of the cells of the present invention exhibited improved characteristics compared to the cells of the comparative examples even when they were made direct methanol fuel cells.

In the above examples, the amount of polymer electrolyte added per apparent electrode area was made 1.0 mg/cm$^2$ for each electrode, and the same characteristics were obtained within a range of 0.1 to 3.0 mg/cm$^2$. Moreover, the amount by weight of platinum added per apparent electrode area was made 0.3 mg/cm$^2$.

EXAMPLE 6

First, carbon particles, ketjen black (Ketjen Black EC manufactured by Ketjen Black International Co.), having a specific surface area of 800 m$^2$/g and a DBP oil adsorption of 360 ml/100 g were caused to support 50% by weight of a platinum catalyst. Next, an alcohol dispersion of polymer electrolyte ("9% FSS solution" (trade name) manufactured by Asahi Glass Co., Ltd.) was diluted with ethanol to adjust the concentration of the polymer electrolyte to 0.1% by weight. This diluted liquid was mixed with an amount of butyl acetate that was 2.90 times the diluted liquid by weight. At this time, the average dielectric constant of the mixed solvent was made 10. The mean particle size of the colloid of the polymer electrolyte in this mixed solvent was measured using a light scattering photometer (a dynamic light scattering photometer DLS-700 manufactured by Otsuka Electronics Co., Ltd.), and the result was 32 nm.

Next, the above-mentioned catalyst-supporting carbon particles were dispersed and mixed into this mixed liquid so as to adsorb the colloid of the polymer electrolyte to the carbon particles.

Meanwhile, carbon particles, acetylene black (DENKA BLACK manufactured by Denki Kagaku Kogyo K. K.), having a specific surface area of 68 $m^2/g$ and a DBP oil adsorption of 175 ml/100 g were caused to support 40% by weight of a platinum catalyst. The resulting catalyst particles were dispersed in an alcohol dispersion of polymer electrolyte ("9% FSS solution" (trade name) manufactured by Asahi Glass Co., Ltd.). At this time, in order to prevent firing of the catalyst particles, it is preferred to add water to wet the catalyst particles in advance.

The mixed liquid containing the carbon particles to which the colloid of the polymer electrolyte was adsorbed and the above-mentioned dispersion were mixed in a weight ratio of 1:2 to produce a catalyst layer ink. This catalyst layer ink was applied on both surfaces of a polymer electrolyte membrane (Nafion 112 membrane manufactured by E. I. du Pont de Nemours and Company) to form a membrane-catalyst layer assembly. Subsequently, a gas diffusion layer carbon paper (Carbon Paper TGPH-060 manufactured by Toray Industries, Inc.) was integrally joined to both surfaces of this membrane-catalyst layer assembly by application of a pressure of 4 $MPa/cm^2$ at 150° C. to form a membrane-electrode assembly. Except for the use of this membrane-electrode assembly, cell P was assembled in the same manner as in Example 1.

Hydrogen and oxygen were supplied to this cell P, and the current-voltage characteristics were measured under the same conditions as in Example 1. As a result, the cell P exhibited a cell voltage of 0.735 V at a current density of 700 $mA/cm^2$. Further, when this cell was made the direct methanol fuel cell, it exhibited a cell voltage of 0.690 V at a current density of 200 $mA/cm^2$.

As described above, during the formation of the colloid of the polymer electrolyte by mixing the second solvent having a dielectric constant different from that of the first solvent into the first solvent in which the polymer electrolyte is dispersed, the concentration of the polymer electrolyte in the first solvent and the dielectric constant of the mixed solvent were adjusted so as to further reduce the particle size of the colloid of the polymer electrolyte, and the colloidal particles were adsorbed to the carbon particles having a larger specific surface area (400 to 1600 $m^2/g$), thereby realizing high-performance electrodes having a large reaction active area.

EXAMPLE 7

This example illustrates an example of adjustment of the particle size of the polymer electrolyte to be adsorbed to the carbon particles.

First, as a dispersion of polymer electrolyte, an ethanol dispersion of polymer electrolyte with a concentration of 9% (Flemion manufactured by Asahi Glass Co., Ltd.) or one obtained by diluting it with ethanol was prepared. A second solvent having a different dielectric constant to the above dispersion was mixed into the dispersion. The mean particle size of the polymer electrolyte in this mixed liquid was measured using a light scattering photometer (a dynamic light scattering photometer DLS-700 manufactured by Otsuka Electronics Co., Ltd.). Table 1 shows the concentration of the polymer electrolyte in the initial ethanol dispersion, the second solvent added to the dispersion, the dielectric constant of the resultant mixed solvent, and the mean particle size of the polymer electrolyte particles produced in the mixed solvent together. The amount of the second solvent is expressed by a ratio to ethanol by weight.

TABLE 1

| No. | Concentration of polymer electrolyte in ethanol dispersion (wt %) | Second solvent added (weight ratio to ethanol) | Dielectric constant of mixed solvent | Mean particle size of polymer electrolyte (nm) |
|---|---|---|---|---|
| 1 | 0.1 | butyl acetate (2.90) | 10 | 32 |
| 2 | 5 | butyl acetate (2.76) | 10 | 200 |
| 3 | 0.1 | water (4.50) | 70 | 30 |
| 4 | 5 | water (4.30) | 70 | 195 |
| 5 | 9 | — | 24.5 | 300 |
| 6 | 9 | butyl acetate (2.65) | 10 | 250 |
| 7 | 9 | water (4.15) | 70 | 250 |

It is clear from Table 1 that the particle size of the polymer electrolyte can be adjusted by adjusting the concentration of the polymer electrolyte before the addition of the second solvent and by adjusting the second solvent. With the use of the dispersion thus prepared, the polymer electrolyte having a desired particle size can be adsorbed to the carbon particles.

EXAMPLE 8

This example illustrates a dispersing method for adjusting the particle size distribution of the catalyst-supporting carbon particles in the ink in the process of preparing the catalyst layer ink and the relationship between the median diameter of the dispersed carbon particles and the glossiness of the catalyst layer formed from the ink.

Inks containing the carbon particles whose median diameter were adjusted by the following various methods were produced, the catalyst layers were formed by applying these inks on transfer sheets, and their glossiness was measured.

1) Carbon particles (furnace black "Ketjen Black EC" (trade name) manufactured by Ketjen Black International Co.) having a specific surface area of 800 $m^2/g$ and a DBP oil adsorption of 360 ml/100 g were caused to support 50% by weight of a platinum catalyst. 10 g of the resulting catalyst particles were mixed with 35 g of water and 59 g of an alcohol dispersion of hydrogen ion conductive polymer electrolyte ("9% FSS solution" (trade name) manufactured by Asahi Glass Co., Ltd.), and the resulting mixture was dispersed using a bead mill dispersing device (Dispermat SL-C12Z manufactured by GETZMANN in Germany) to produce an ink-1 This ink-1 was applied on a polypropylene film (Torayfan 50-2500 manufactured by Toray Industries, Inc.) by using a comma coater, and dried to form a catalyst layer.

2) An ink—2 was produced in the same manner, except that a stirrer and an ultrasonic homogenizer (US600T manufactured by NIPPON SEIKI CO. LTD.) were used instead of the bead mill dispersing device mentioned in 1), and it was applied to form a catalyst layer.

3) Platinum and ruthenium were subjected to an alloying process at 800° C. for 30 minutes. The resulting alloy was caused to be supported on the carbon particles in a weight ratio of 50%. An ink-3 was produced in the same manner as in 1) except for the use of this alloy catalyst, and it was applied to form a catalyst layer.

4) An ink 4) was produced in the same manner as in 2), except that the same platinum-ruthenium alloy catalyst as in 3) was used instead of the platinum catalyst mentioned in 2), and it was applied to form a catalyst layer.

5) The carbon particles supporting the alloy mentioned in 3) were subjected to hydrophilicity treatment and then mixed with a dispersion of polymer electrolyte and water. An ink-5 was produced in the same manner as in 1) except for this hydrophilicity treatment, and it was applied to form a catalyst layer. The hydrophilicity treatment was performed as follows. First, 10 g of the carbon particles supporting the alloy was dipped in hydrogen peroxide water, and slowly stirred for 30 minutes. Next, after filtering the carbon particles and washing them with distilled water, they were dried at room temperature and sufficiently ground with a mill. An appropriate amount of the oxidizing agent added to the carbon particles was 10 to 20 times the carbon particles.

6) The carbon particles supporting the alloy mentioned in 3) were subjected to the hydrophilicity treatment and then mixed with a dispersion of polymer electrolyte and water. An ink-6 was produced in the same manner as in 2) except for this hydrophilicity treatment, and it was applied to form a catalyst layer.

7) An ink-7 was produced in the same manner as in 1), except that stirring was performed using a stirrer instead of the dispersing operation performed by the bead mill dispersing device, and it was applied to form a catalyst layer.

8) An ink-8 was produced in the same manner as in 3), except that stirring was performed using a stirrer instead of the dispersing operation performed by the bead mill dispersing device, and it was applied to form a catalyst layer.

Each of the above-mentioned inks was dispersed in a water-ethanol mixed solvent having the same composition as the dispersion medium of the ink, and the particle size of the catalyst-supporting carbon particles was measured using a particle size distribution measuring device (MICROTRAC-HRA manufactured by Nikkiso Co. Ltd.). Moreover, the glossiness of each catalyst layer formed on the polypropylene film was measured using a gloss meter (PG-1M manufactured by Nippon Denshoku Industries Co. Ltd.) based on an evaluation method of JIS-Z8741. The results are shown in Table 2.

TABLE 2

| Ink | Median diameter of catalyst-supporting carbon particles (μm) | 85° glossiness of catalyst layer (%) |
|---|---|---|
| 1 | 0.15–0.73 | 73–91 |
| 2 | 1.8–2.6 | 22–30 |
| 3 | 10.1–12.3 | 1–8 |
| 4 | 6.8–7.4 | 5–13 |
| 5 | 0.2–1.3 | 54–87 |
| 6 | 1.1–1.8 | 21–38 |
| 7 | 9.8–13.7 | 1–10 |
| 8 | 10.6–11.2 | 1–9 |

The platinum-supporting carbon particles of the ink-7 resulting from stirring using only the stirrer had a median diameter of 9.8 to 13.7 μm, while the carbon particles of the ink-2 obtained by performing dispersion using the ultrasonic homogenizer were dispersed to 1.8 to 2.6 μm, and an addition dispersion effect at a sub-micron level of 0.15 to 0.73 μm was obtained in the ink-1 resulting from stirring using the bead mill.

However, among the inks using the platinum-ruthenium alloy catalyst, the carbon particles of the ink-8 resulting from stirring using only the stirrer showed a median diameter of 10.6 to 11.2 μm, while the median diameter of the carbon particles of the ink-4 obtained by performing dispersion using the ultrasonic homogenizer was 6.8 to 7.4 μm, and thus the effect as satisfactory as that obtained using the platinum catalyst was not obtained. Moreover, in the alloy catalyst ink-3 resulting from stirring using the bead mill, the medium diameter was 10.1 to 12.3 μm, and this means that the particles aggregated conversely. When this alloy catalyst ink-3 was carefully observed, fine particles at a sub-micron level were observed on the particle surface, and thus it would be considered that the particles which were once ground to the sub-micron level aggregated again.

Next, in the ink-6 prepared by dispersing the alloy catalyst that received the hydrophilicity treatment with the ultrasonic homogenizer, the median diameter was 1.1 to 1.8 μm. Further, in the ink-5 prepared by dispersing the alloy catalyst that received the same hydrophilicity treatment with the bead mill, the median diameter was 0.2 to 1.3 μm. Since all the results show that all the catalyst particles that received the hydrophilicity treatment had a smaller median diameter, it would be considered that re-aggregation was suppressed by the application of the hydrophilicity treatment to the alloy catalyst.

The platinum catalyst layer formed from the ink-2 prepared by performing dispersion using the homogenizer had a glossiness of 20 to 30%, while the platinum catalyst layer formed from the ink-1 obtained by performing dispersion using the bead mill had a glossiness of 73 to 91%. It would be considered that the bead mill had a higher dispersion effect than the ultrasonic homogenizer, and achieved a higher glossiness. However, in the catalyst layers using the ink-3 and ink-4 in which re-aggregation was confirmed, their glossiness was lowered to 1 to 8% and 5 to 13%, respectively. The reason for such results would be that re-aggregation causes enlargement of the alloy catalyst particles, a rough coated surface of the catalyst layer, and scattering of light. The alloy catalyst layer formed from the ink-6 prepared by dispersing the alloy catalyst that received the hydrophilicity treatment with the ultrasonic homogenizer had a glossiness of 21 to 38%, while the alloy catalyst layer formed from the ink-5 prepared by performing dispersion using the bead mill showed a value of 54 to 87%. Since the particles in the coating were made smaller by the hydrophilicity treatment, the glossiness was increased. The effect of the bead mill was particularly significant, and high glossiness and an extremely dense and smooth coating film were obtained.

Although the above explanation discusses the catalyst layer formed on the polypropylene film, the same effects are also obtained by applying the catalyst layer on the polymer electrolyte membrane or by the catalyst layer formed on the polymer electrolyte membrane by transfer.

Figure 11:
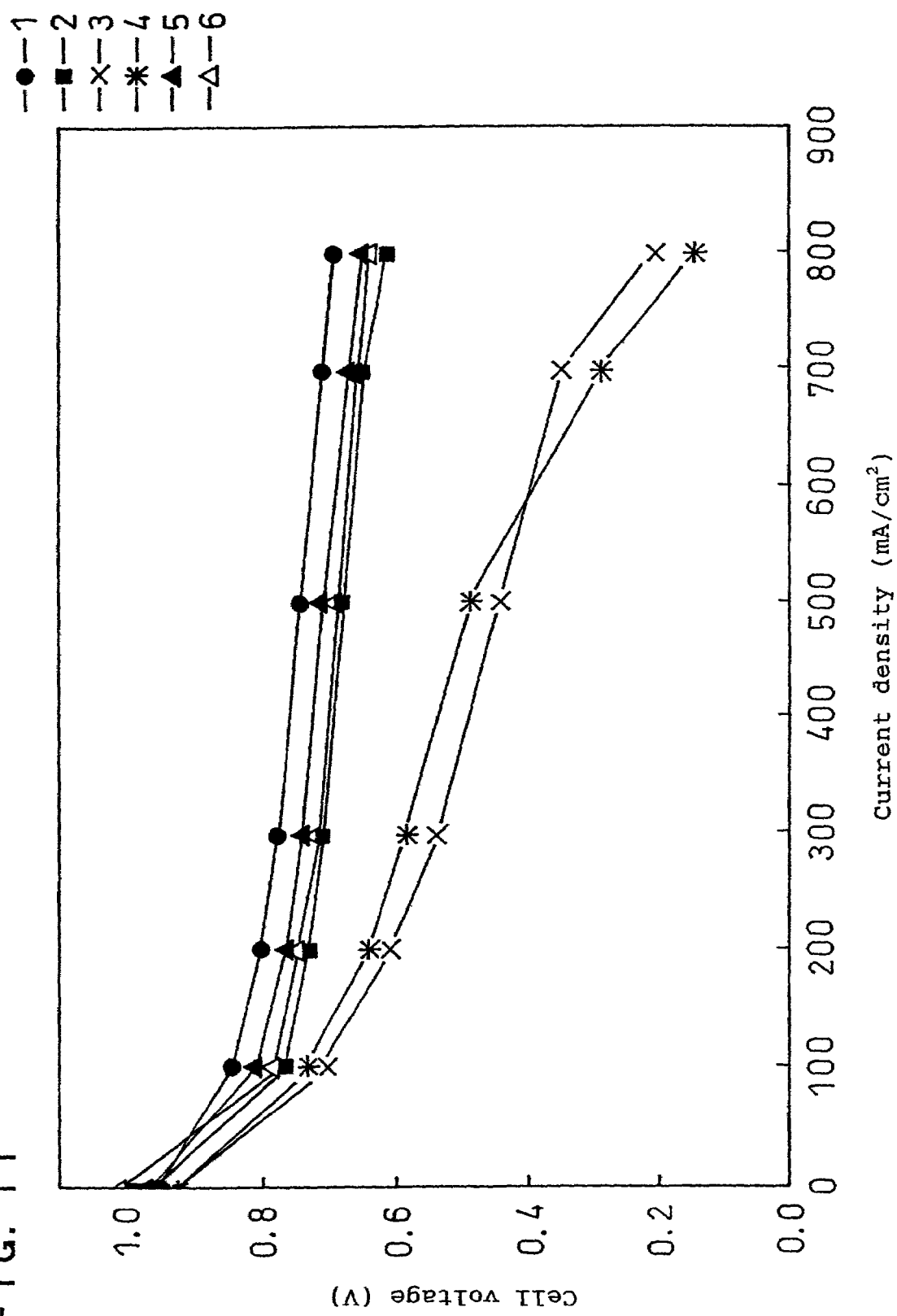
FIG. 11 is a view showing the current-voltage characteristics of fuel cells when the catalyst layers were formed using various types of coatings.
Figure 12:
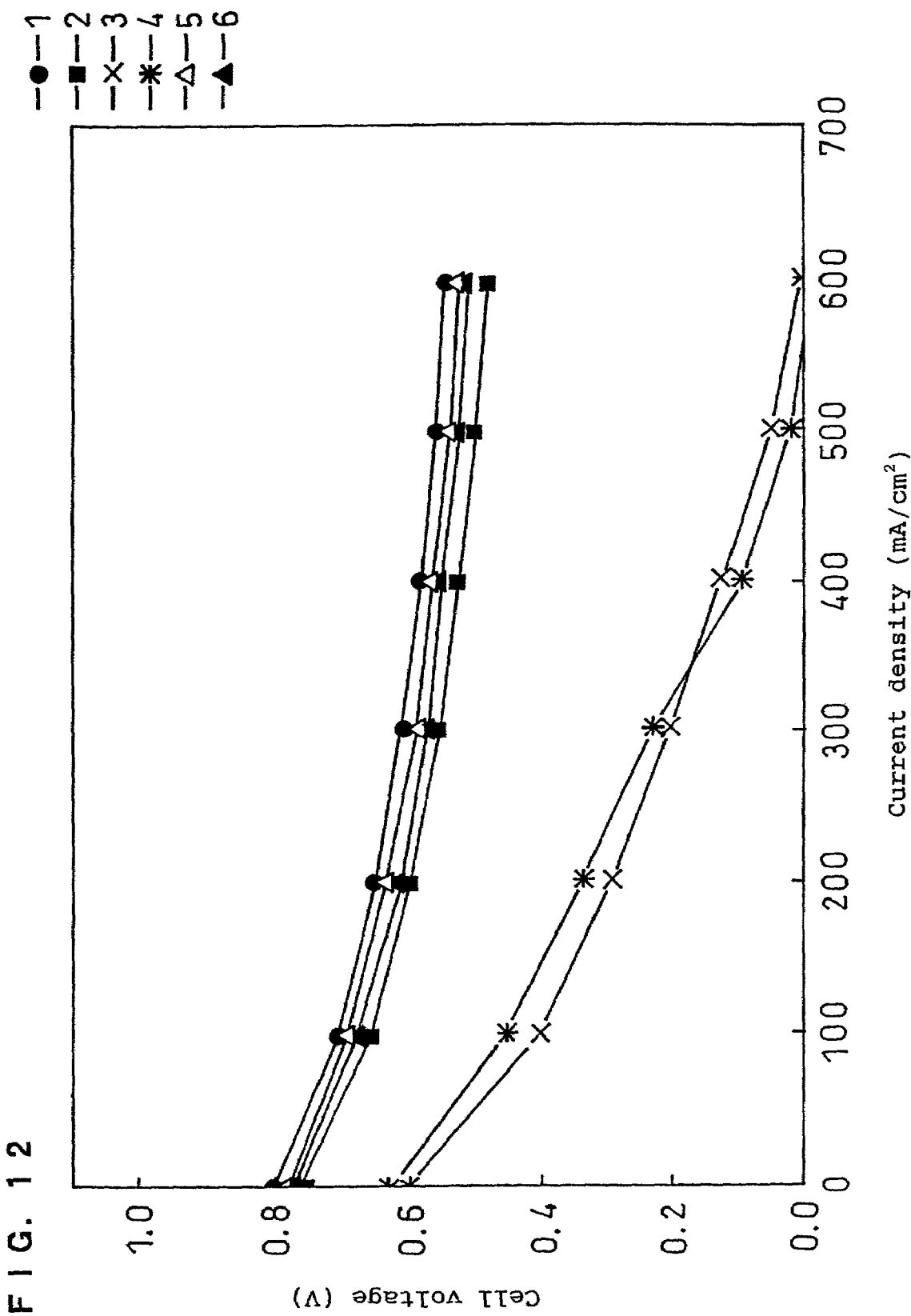
FIG. 12 is a view showing the current-voltage characteristics of the same fuel cells when an aqueous methanol solution was used as a fuel.

Next, air-hydrogen fuel cells were assembled in the same manner as in Example 1, except that a pair of electrodes, which was formed by applying the above-described inks-1 to 6 on carbon paper so that the amount of the catalyst metal was 0.3 mg/cm$^2$, was used. FIG. 11 shows a comparison of the current-voltage characteristics of these cells. Further, FIG. 12 shows the current-voltage characteristics as the direct methanol fuel cells similar to the above.

It is clear from these figures that the discharge characteristics of cells-1, 2, 5 and 6 using the inks-1, 2, 5 and 6, which comprise the catalysts of a small medium diameter and produce catalyst layers with high surface glossiness, showed high values. Among them, the cell-1, in which the catalyst had a sub-micron level median diameter of 0.15 to 0.73 μm and the catalyst layer had a glossiness of 73 to 91%, exhibited the highest characteristic, and the characteristic of the cell-5, in which the catalyst had a 1 µm-level median diameter of 0.2 to 1.3 µm and the catalyst layer had a glossiness of 54 to 87%, showed the second best result. Next, good characteristics were shown by the cells-6 and 2 in which the catalyst had the median diameter within a range of 1 to 3 µm and the catalyst layer had a glossiness of 21 to 38% because of ultrasonic dispersion, although bead mill dispersion was not performed.

As described above, the median diameter of the catalyst and the glossiness of the catalyst layer exert great influence on the cell characteristics, and superior cell characteristics are obtained by realizing a dense and smooth catalyst layer having good ink dispersibility and high glossiness. In FIGS. 11 and 12, only one kind of carbon particles were used, but it is apparent that superior performance is given by the use of two or more kinds of carbon particles according to the present invention.

INDUSTRIAL APPLICABILITY

As described above, according to the present invention, three channels: a gas channel formed by the void between the carbon particles as a passage for supplying a fuel or an oxidant gas; a proton channel formed by the polymer electrolyte containing water; and an electron channel formed by mutual connection of the carbon particles, are formed very close to each other inside the catalyst layer of an electrode, and the reaction area is increased. Hence, the supply of hydrogen and an oxygen gas and the transfer of proton and electron are simultaneously and smoothly carried out over a wide range, and thus it is possible to provide a solid polymer electrolyte fuel cell exhibiting higher discharge performance.

The invention claimed is:

1. A polymer electrolyte fuel cell comprising: a hydrogen ion conductive polymer electrolyte membrane; and a pair of electrodes having catalyst layers sandwiching said hydrogen ion conductive polymer electrolyte membrane therebetween and gas diffusion layers in contact with said catalyst layers, wherein at least the catalyst layer of one of said electrodes comprises carbon particles supporting a noble metal catalyst, and said carbon particles comprise at least first carbon particles adsorbing a first hydrogen ion conductive polymer electrolyte comprising first polymer electrolyte particles having first particle sizes and second carbon particles adsorbing a second hydrogen ion conductive polymer electrolyte comprising second polymer electrolyte particles having second particle sizes, wherein the first and the second carbon particles may be the same or different and the first and second particle sizes of the first and second polymer electrolyte particles are different.

2. The polymer electrolyte fuel cell as set forth in claim 1, wherein the first and the second carbon particles differ from each other in specific surface area or DBP oil adsorption.

3. A polymer electrolyte fuel cell comprising: a hydrogen ion conductive polymer electrolyte membrane; and a pair of electrodes having catalyst layers sandwiching said hydrogen ion conductive polymer electrolyte membrane therebetween and gas diffusion layers in contact with said catalyst layers, wherein at least the catalyst layer of one of said electrodes comprises carbon particles supporting a noble metal catalyst, and said carbon particles comprise at least first carbon particles adsorbing a first hydrogen ion conductive polymer electrolyte comprising first polymer electrolyte particles having first particle sizes and second carbon particles adsorbing a second hydrogen ion conductive polymer electrolyte comprising second polymer electrolyte particles having second particle sizes, wherein the first and the second carbon particles may be the same or different and the first and second particle sizes of the first and second polymer electrolyte particles are different, wherein the first particle sizes of said first hydrogen ion conductive polymer electrolyte particles are within a range of 30 to 200 nm when measured by a light-scattering photometer.

4. A polymer electrolyte fuel cell comprising: a hydrogen ion conductive polymer electrolyte membrane; and a pair of electrodes having catalyst layers sandwiching said hydrogen ion conductive polymer electrolyte membrane therebetween and gas diffusion layers in contact with said catalyst layers, wherein at least the catalyst layer of one of said electrodes comprises carbon particles supporting a noble metal catalyst, and said carbon particles comprise at least first carbon particles adsorbing a first hydrogen ion conductive polymer electrolyte comprising first polymer electrolyte particles having first particle sizes and second carbon particles adsorbing a second hydrogen ion conductive polymer electrolyte comprising second polymer electrolyte particles having second particle sizes, wherein the first and the second carbon particles may be the same or different and the first and second particle sizes of the first and second polymer electrolyte particles are different, wherein the first carbon particles have a specific surface area of 30 to 400 $m^2/g$ and the second carbon particles have a specific surface area of 400 to 1600 $m^2/g$, and the first and second particle sizes of the first and the second polymer electrolyte particles adsorbed to said first and second carbon particles are within a range of 30 to 200 nm and a range of 200 to 500 nm, respectively, when measured by a light-scattering photometer.

* * * * *